M. PFAU.
TYPE WRITER ESCAPEMENT CLUTCH.
APPLICATION FILED APR. 14, 1911.
1,016,172.
Patented Jan. 30, 1912.
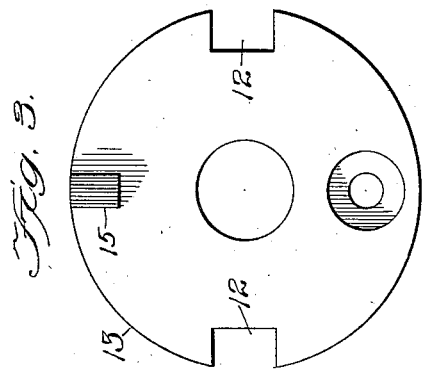
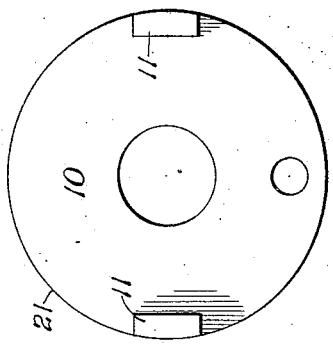
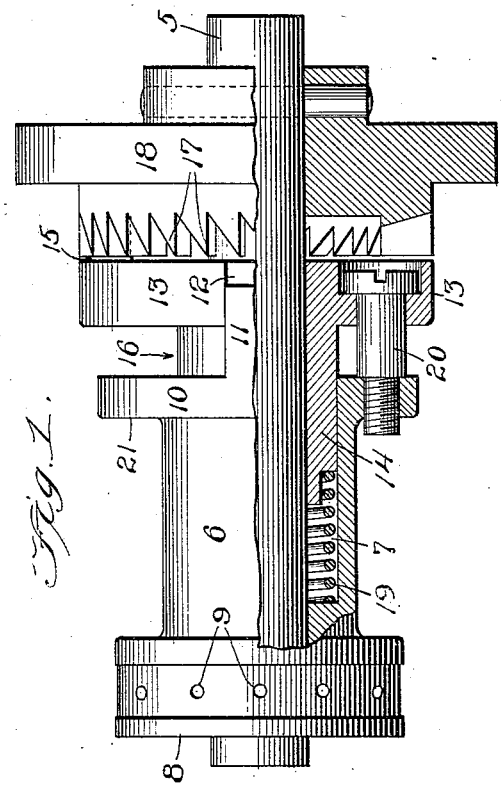
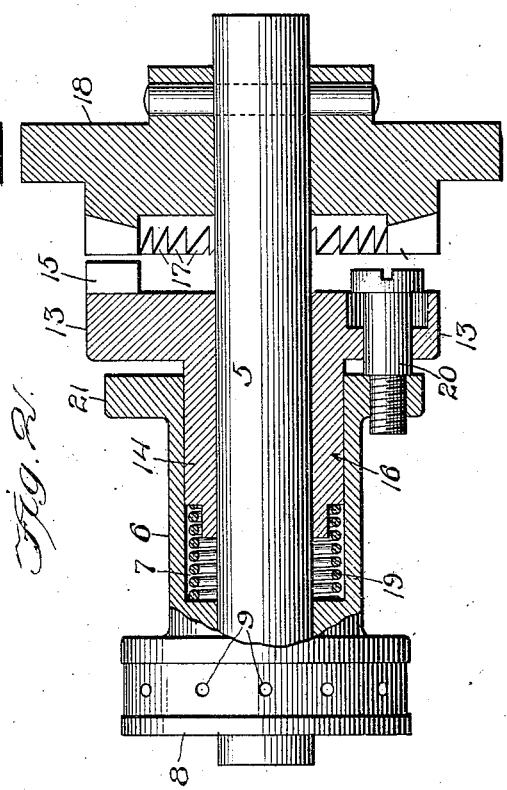
WITNESSES
INVENTOR
Max Pfau
by Banning & Banning
Attys

UNITED STATES PATENT OFFICE.

MAX PFAU, OF WOODSTOCK, ILLINOIS, ASSIGNOR TO THE EMERSON TYPEWRITER CO., OF WOODSTOCK, ILLINOIS, A CORPORATION OF ILLINOIS.

TYPE-WRITER ESCAPEMENT-CLUTCH.

1,016,172.  Specification of Letters Patent.  Patented Jan. 30, 1912.

Application filed April 14, 1911.  Serial No. 621,105.

*To all whom it may concern:*

Be it known that I, MAX PFAU, a citizen of Saxony, Germany, residing at Woodstock, in the county of McHenry and State of Illinois, have invented certain new and useful Improvements in Type-Writer Escapement-Clutches, of which the following is a specification.

The present invention relates to a clutch adapted to control the movements of the sprocket wheel which engages the rack of a carriage to feed the carriage longitudinally of itself.

One object of the present invention is to provide a clutch member which will be slidably movable with respect to the sprocket member, and which will slide with a rectilinear movement and travel in and out of engagement with a fixed clutch member with a straight in and out movement.

Another object of the invention is to provide tension mechanism for assisting the movable clutch member to return to normal position.

A further object of the invention is to provide means for guiding the clutch member in its in and out movements. And a still further object of the invention is to provide means for adjusting the degree of movement of the clutch member.

The invention further consists in the features of construction and the combination of parts hereinafter described and claimed.

In the drawings, Figure 1 is a sectional view showing the clutch member of the present invention in operative connection with the sprocket member and in clutch engagement with the feeding clutch; Fig. 2, a view similar to Fig. 1, showing the clutch mechanism disengaged; Fig. 3, a face view of the movable clutch member; and Fig. 4, an end view of the sprocket member, showing the lugs thereon for guiding the clutch member in its movements.

In typewriter mechanism, it is necessary to provide a clutch connection for operating the sprocket which engages the rack bar upon the carriage. This clutch connection is for the purpose of permitting the free movement of the carriage in one direction, that is, when it is returned to normal position, and to effect a stepped movement of the carriage when it is being moved out of normal position during the writing operation. In illustrating the present invention, only that portion of the mechanism is shown which is deemed to constitute the subject matter of the invention. The other operative parts of the machine, as, for instance, the mechanism for actuating what may be termed the feeding clutch, are not shown. It is understood that any old and well known means may be utilized for performing this operation or other operations usually attendant upon the actuation of these devices.

The sprocket and clutch member of the present invention are shown mounted upon a stub shaft 5, which is secured in proper mountings upon the body of the machine. The sprocket member is in the form of a cylindrical body portion 6, provided with an interior chamber 7 and with a head 8. The head 8, as shown, is provided with a series of recesses 9, which form the teeth that engage with the rack bar. It is, of course, understood that this particular form of tooth may be varied without departing from the spirit of the invention. The end of the sprocket member opposite to the head 8 is open and is in the nature of a rim 10, best shown in Fig. 4. Extending out from said rim are a series of lugs 11. These lugs enter into grooves 12 formed in the periphery of a flange 13 extending from a hub 14. The outer face of the flange 13 is provided with a clutch tooth 15. This flange and hub are what constitute the movable clutch member 16 of the present invention. By reason of the flange and recess connection between the movable clutch member and the sprocket member, the said clutch member is guided in its in and out movements so that it travels with a rectilinear movement in and out of engagement with the fixed clutch member, so that an accurate and firm engagement between the clutch tooth of the movable clutch member and the teeth 17 of a fixed clutch member 18 is insured and the forcing of the tooth of the movable clutch member out of engagement by a blow of unusual violence prevented. It will be noted that the movable clutch member is slidably mounted upon the shaft 5, and that, because of such mounting and the guide members heretofore referred to, a movement of the clutch member in a rectilinear line parallel with the shaft is insured.

Located within the chamber 7 is a coiled spring 19, which serves to normally hold in forwardly projected position the movable clutch member 16, but it provides a resilient backing for the movable clutch member so that it can readily slide within the chamber 7 and telescope within the sprocket member, which action is to release it from engagement with what may be termed the fixed clutch member 18. Of course, both of the clutch members are revolved. The terms "loose" and "fixed" are only used as indicating their movements with respect to the shaft 5, the clutch member 18 being, as shown, keyed to said shaft.

In order to adjust the movements of the movable clutch member, a threaded member 20 is provided, which is entered through the flange 13 of the movable clutch member 16, and is entered into a flange 21 on the sprocket member 6. It is obvious that by adjusting this screw-threaded member so that the head thereof extends farther or nearer to the sprocket member, the degree of outward movement of the movable clutch member may be regulated, the head of the screw-threaded member resting within a recess in the flange 13 and serving, by reason of its enlarged size, to limit or check the outward movement of said clutch member. It is, however, noted that the screw-threaded member 20 is of such a configuration that it allows of a sliding movement of the clutch member longitudinally thereof. This screw-threaded member 20 further serves as a guide member to insure the movable clutch member traveling in a direct line in its in and out movements. By arranging the tension member in the manner shown, there is nothing which tends to deflect the clutch member from a line of travel parallel to the shaft 5 during its in and out movements, so that there will be no danger of any binding during such movements, which might be the case if the tension member exerted a force tending to deflect the clutch member from a movement parallel to the shaft.

The sprocket member is, of course, loose upon the shaft, and the connection between the sprocket member and clutch member is by means of the screw-threaded member 20 and the lugs 11 and the slots 12, so that these members, in addition to performing the function of guide members, also serve to form the connection between the clutch member and the sprocket member. Such connection is of a nature to readily permit of a telescoping or sliding movement between the clutch member and sprocket member, but, at the same time, prevents rotative movement of the clutch member with respect to the sprocket member, and these two members at all times must rotate in unison.

I claim:

1. In a typewriter escapement clutch, the combination of an escapement member, a fixed clutch member, a slidable clutch member, a slot and lug connection between the escapement member and slidable clutch member, said lugs extending in the direction of movement of the movable clutch member, an adjustable headed stem fixedly held in the escapement member and slidably mounted in the movable clutch member, said stem serving to prevent disengagement of the slot and lug connection and serving to limit the sliding movement therebetween, substantially as described.

2. In a typewriter escapement clutch, the combination of an escapement member, a sleeve extending therefrom and terminating in a flanged rim, a fixed clutch member, a movable clutch member comprising a sleeve terminating in a flanged rim, the two sleeves telescoping within one another, tension mechanism for holding the flanged rims normally spaced away from one another, a slot and lug connection between said rims, and a headed stem screw-threaded into the escapement sleeve flange and having a sliding abutting engagement with the movable clutch sleeve flange and serving to prevent disengagement of the slot and lug connection, substantially as described.

MAX PFAU.

Witnesses:
FRANK WILDER,
D. C. AKERS.

---

Copies of this patent may be obtained for five cents each, by addressing the "Commissioner of Patents, Washington, D. C."